United States Patent [19]

Tokoro et al.

[11] Patent Number: 4,743,223
[45] Date of Patent: May 10, 1988

[54] SPEED RATIO CONTROL SYSTEM FOR A CONTINUOUSLY VARIABLE TRANSMISSION FOR VEHICLE

[75] Inventors: Setsuo Tokoro; Tomoyuki Watanabe; Takashi Hayashi, all of Susono; Takashi Shigematsu, Mishima, all of Japan

[73] Assignee: Toyota Jidosha Kabushiki Kaisha, Japan

[21] Appl. No.: 870,182

[22] Filed: Jun. 3, 1986

[30] Foreign Application Priority Data

Jun. 3, 1985 [JP] Japan .................. 60-120073

[51] Int. Cl.$^4$ ............................. F16H 11/02
[52] U.S. Cl. ....................... 474/69; 474/28; 74/856
[58] Field of Search ........... 474/69, 70, 28, 11, 474/12, 16, 18; 74/866, 867, 856; 364/424.1

[56] References Cited

U.S. PATENT DOCUMENTS

| | | | |
|---|---|---|---|
| 4,594,916 | 6/1986 | Ito et al. ................... | 474/70 X |
| 4,601,680 | 7/1986 | Tokoro et al. ............. | 474/11 |
| 4,628,773 | 12/1986 | Itoh et al. .................. | 74/867 |
| 4,642,068 | 2/1987 | Osanai et al. .............. | 474/28 X |

Primary Examiner—Stephen J. Novosad
Assistant Examiner—Thuy M. Bui
Attorney, Agent, or Firm—Parkhurst & Oliff

[57] ABSTRACT

A speed ratio control system for a continuously variable transmission is provided, wherein an oil flowrate to a hydraulic servo of an input or an output V-shaped pulley device is varied by a flow control valve, so that a speed ratio between the input and the output sides can be continuously changed. The system determines a deviation between a target value and a measured value and corrects the measured value in accordance with at least the characteristics of the flow control valve, so that the deviation and a rate of change per unit time of the speed ratio, or the deviation and a rate of change per unit time of a rotational speed of the input or output pulleys, will have a linear relationship over the entire area of control. This system avoids poor feedback gain because of the non-linearity of the characteristics of the flow control valve. Thus, the feedback gain is acceptable over the entire area of control of the continuously variable transmission. Even when the conditions of use are different, the speed ratio (or the input or output rotational speeds) can be stably controlled without disturbing the response.

8 Claims, 11 Drawing Sheets

SPEED RATIO CONTROL SYSTEM FOR A CONTINUOUSLY VARIABLE TRANSMISSION FOR VEHICLE

BACKGROUND OF THE INVENTION

This invention relates to a speed ratio control system for a continuously variable transmission for a vehicle, and more particularly to improvements in a speed ratio control system. An oil flowrate to a hydraulic servo of either an input or an output V-shaped pulley device is varied by a flow control value, so that a speed ratio between the input and the output sides can be changed.

In the past, a belt-driven continuously variable transmission have been used as automatic transmissions for vehicles. In general, these continuously variable transmission mechanisms have V-shaped pulley devices, each including a stationary pulley and a movable pulley which cooperate to create an effective diameter which is variable. Hydraulic servo devices are used to move the movable pulley. The V-shaped pulley devices are provided on input and output shafts with a driving belt extending therebetween so that rotation of the input shaft can be transferred to the output shaft. Normally, an oil flowrate to the hydraulic servo device on the input side is adjusted by a flow control valve, whereby the effective diameter of the V-shaped pulley device on the input side is changed. The hydraulic pressure of the hydraulic servo device on the output side is varied by a pressure control valve to thereby follow the change of the effective diameter of the V-shaped pulley device on the input side, so that the driving belt does not slip in transmitting the torque.

As compared with an automatic transmission mechanism consisting of a torque converter with groups of planetary gear units, the above-described continuously variable transmission mechanism is advantageous in that these are for abrupt changes in driving force during running of the vehicle, shift shocks are low, and the fuel consumption rate is good. In recent years, demand has increased for further improvements in the continuously variable transmission mechanism.

The speed ratio control of the continuously variable transmission has heretofore been performed as described below. First, a target value (normally, a target rotational speed Nin° or a target speed ratio e°) is calculated, a deviation $D = \text{Nin}° - \text{Nin}$ (or $D = e° - e$) is calculated, and, in accordance with this deviation D, an oil flowrate Q (=a control voltage Vin of the flow control value, being commensurate to the oil flowrate Q) to the hydraulic servo device on the input side is calculated through an equation $\text{Vin} = K \cdot D$. This K is a feedback gain and has heretofore been set at a constant value.

However, because of non-linearity of the system being controlled, the optimal value of this feedback gain differs depending on the conditions of use. In consequence, if the feedback gain K is a constant, then the feedback gain K may be optimal for some uses, but not for other uses. Thus, the feedback gain K may be excessively large and thereby cause hunting, etc., or may be excessively small and thereby deteriorate the response or controlling accuracy.

To obviate the above-described disadvantages, in Japanese Patent Laid-Open (Kokai) No. 191358/1983 for example, an equation ($\text{Vin} = K1 \times PL' \times D$) is used to correct a line pressure PL. Specifically, this correction adjusts the control voltage Vin to the flow control valve in accordance with an output voltage Vout to a pressure control valve. The control voltage Vout to the pressure control valve is corrected in association with the control voltage Vin to the flow control valve, so that the flowrate Q, i.e., the speed ratio, can be suitably controlled, irrespective of the line pressure PL.

However, this system is not satisfactory because the effect is not precise.

SUMMARY OF THE INVENTION

The present invention was developed to obviate the above-described disadvantages and drawbacks of the prior art. Accordingly, it is an object of the present invention to provide a speed ratio control system for a continuously variable transmission, wherein, particularly, poor feedback gain due to the non-linearity of the characteristics of a flow control valve is avoided. The feedback gain is adequate over the entire control area of a continuously variable transmission, and, even when the conditions of use are different, speed ratio (or an input rotational speed) can be stably controlled without a deterioration in the response.

To achieve the above-described object, the present invention contemplates a speed ratio control system for a continuously variable transmission in which oil flowrate to a hydraulic servo of either an input or output V-shaped pulley device is varied by a flow control valve, so that a speed ratio between the input and the output sides can be continuously changed. The contemplated system includes:

means for seeking a deviation between a target value and a measured value; and means for making a correction in accordance with at least the characteristics of the flow control valve, so that the deviation is in a linear relationship with a rate of change per unit time of the speed ratio of the continuously variable transmission, or a rate of change per unit time of a rotational speed of said input or output pulleys (on the side where the oil flowrate is varied) over the entire area of control.

In another specific form of the present invention, at least the characteristics of the flow control valve, associated with a difference in oil pressure upstream and downstream of the flow control valve or the leak characteristics of the flow control valve, are determined so that the characteristics of the flow control valve can be precisely reflected in the speed ratio control.

Heretofore, the characteristics of the flow control valve have impaired the linearity of the performance of the speed ratio control. According to this invention corrections are made in accordance with the characteristics of the flow control valve, so that the intended speed ratio control can be accurately achieved at all times, irrespective of the non-linearity of the flow control valve.

Additionally, in conventional control systems, a rate of change per unit time of the speed ratio or a rate of change per unit time of the rotational speed of the input or output pulleys (where the oil flowrate is varied) is dependent on a change in the oil flowrate to the hydraulic servo device. This change in oil flowrate is dependent on a change in control voltage to the flow control valve for controlling the oil flowrate. Accordingly, in the present invention the stage at which the correction is made does not matter. Namely, it does not matter if the correction is made at a stage at which the oil flowrate is calculated or a stage at which the control voltage is calculated. However, it is important that the correction is made in accordance with the characteristics of the flow control valve so as to maintain the linearity of the control.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein.

DETAILED DESCRIPTION OF THE PREFERRED EMBODIMENTS

The present invention will be described in detail with reference to the accompanying drawings which illustrate a preferred embodiment of the present invention.

Figure 2:
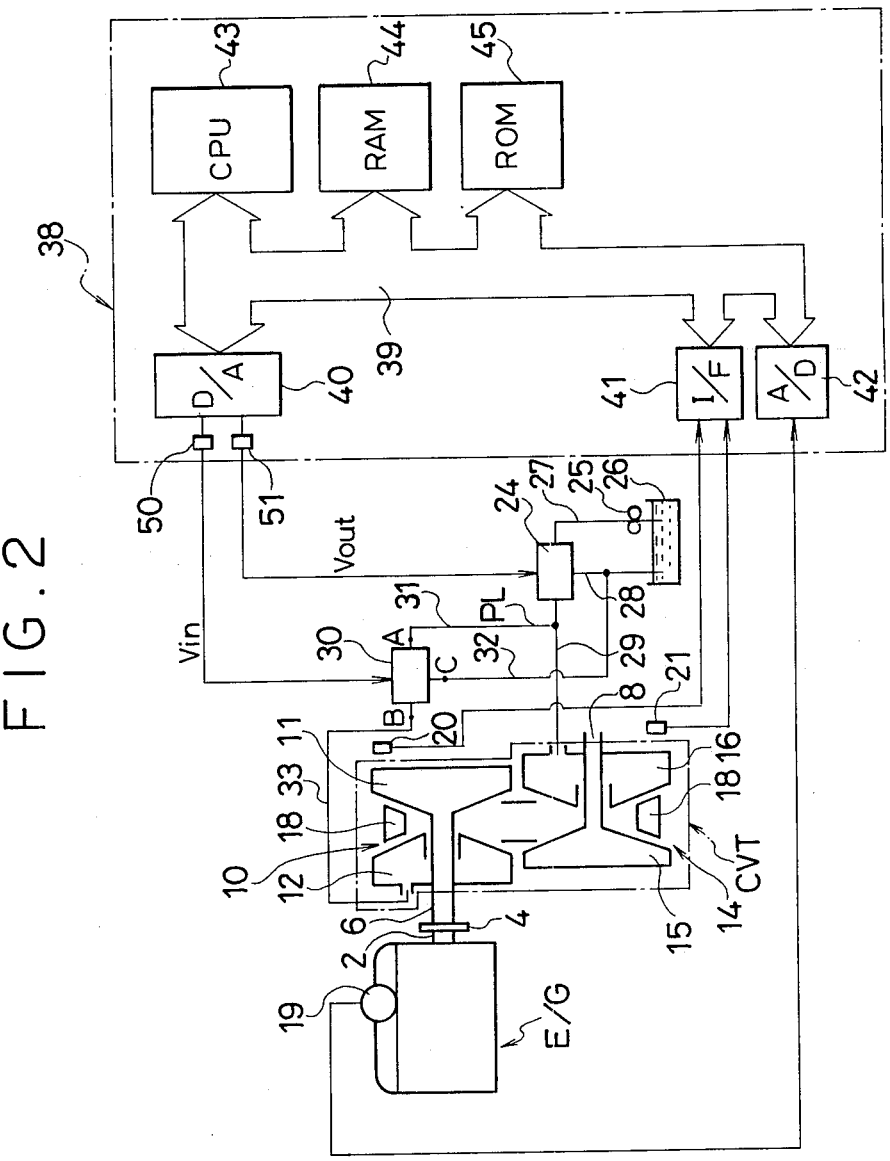
FIG. 2 is a schematic block diagram of a continuously variable transmission to which the present invention is applied.

FIG. 2 shows the general diagram of the continuously variable transmission to which one embodiment of the speed ratio control system according to the present invention is applied.

Referring to the drawing, an output shaft 2 of an internal combustion engine E/G is connected to a continuously variable transmission (hereinafter referred to as a "CVT") through a clutch mechanism 4.

The CVT is provided on input and an output shafts 6 and 8 with V-shaped pulley devices 10 and 14. The V-shaped pulley 10 includes a stationary pulley 11 and a movable pulley 12, and V-shaped pulley 14 includes a stationary pulley 15 and a movable pulley 16. The stationary pulley 11 on the input side is fixed to the input shaft 6 and the movable pulley 12 on the input side is axially movably coupled to the input shaft 6 through splines, ball bearings or the like. Similarly, the stationary pulley 15 on the output side is fixed to the output shaft 8 and the movable pulley 16 on the output side is axially movably coupled to the output shaft 8 through splines, ball bearings or the like. Pressure receiving areas of the respective movable pulleys 12 and 16 are set such that the area on the input side is larger than that on the output side. A forcible change in the effective diameter can be made on the input side to vary the speed ratio. On the input and the output sides, movements in the axial direction of the stationary pulleys 11, 15 and the movable pulleys 12, 16 are made opposite to each other, so that a driving belt 18 is constantly guided around the input and the output shaft 6 and 8 at right angles.

Opposed surfaces of the stationary pulleys 11, 15 and the movable pulleys 12, 16 are formed on tapered planes with distances therebetween increasing radially outwardly. The driving belt 18, being an isosceles trapezoid in cross section, is extended between the V-shaped pulley devices 10 and 14 on the input and output sides. The driving belt 18 continuously varies in its contact positions in the radial direction on the pulley surfaces in accordance with the change in the clamping forces of the stationary and movable pulleys of the respective V-shaped pulley devices 10 and 14. When the contact position of the driving belt 18 in the V-shaped pulley device 10 on the input side moves radially outwardly, the contact position of the driving belt 18 in the V-shaped pulley device on the output side moves radially inwardly, and the speed ratio e of the CVT (=Nout (a rotational speed of the output shaft 8)/Nin (a rotational speed of the input shaft)) increases. In the reverse case, the speed ratio e decreases.

A driving force of the output shaft 8 is transmitted to a traction wheel by way of a planetary gear unit for switching the forward and reverse movement, gears for speed decrease, differential gears and the like which are not shown.

On the other hand, a throttle opening sensor 19 detects an opening Ath of a throttle valve (not shown) of the intake system. An accelerator pedal (not shown) is connected to the throttle valve of the intake system, so that the output from the engine E/G can be a desired function of a value of the depression of the accelerator pedal.

Rotational angle sensors 20 and 21, on the input and output sides, detect the angles of rotation of the pulleys 11 and 16, respectively. As a result, the input shaft speed and the output shaft speed (rpm) are detected.

A pressure control valve 24 controls a spill value of oil delivered from a reservoir 26 through an oil line 27 by an oil pump 25 to an oil line 28, to thereby regulate a line pressure PL of an oil line 29. A hydraulic servo device of the movable pulley 16 on the output side is fed with the line pressure PL through the oil line 29.

A flow control valve 30 controls the flow of oil into and out of the movable pulley 12 on the input side. To maintain the speed ratio e of the CVT at a constant value, an oil line 33 is disconnected from a line pressure oil line 31, which is branched from the oil line 29, and a drain oil line 32. As a result, the axial position of the movable pulley 12 on the input side is held constant and the speed ratio e is maintained at a constant value. To increase the speed ratio e, oil is fed into the hydraulic servo device of the movable pulley 12 on the input side from the line pessure oil line 31 through the oil line 33. As a result, the clamping forces between the pulleys 11 and 12 on the input side increase, whereby the contact positions of the driving belt 18 on the surfaces of the pulleys 11 and 12 on the input side move radially outwardly, so that the speed ratio e increases. On the contrary, to decrease the speed ratio e, oil in the hydraulic servo device of the movable pulley 12 on the input side is drained through the drain oil line 32, whereby the clamping forces between the pulleys 11 and 12 on the input side decrease. The oil pressure in the oil line 33 is less than the line pressure PL. However, as described above, the pressure receiving area of the hydraulic servo device of the movable pulley 12 on the input side is set at a value larger than that of the pressure receiving area of the hydraulic servo device of the movable pulley 16 on the output side, so that the clamping force of the pulleys 11 and 12 is larger than the clamping force of the pulleys 15 and 16 on the output side.

The clamping force of the pulleys 11 and 12 on the input side is varied by the flow control valve 30, thus changing the effective diameter between the pulleys 11 and 12 on the input side while the line pressure PL is regulated by the pressure control valve 24 so that clamping forces are generated between the pulleys 15 and 16 on the output side. The change in effective diameter of the output side pulley follows the change in the effective diameter on the input side, so that the torque can be transferred without slip of the driving belt.

An electronic control unit 38 includes a D/A converter 40, an input interface 41, an A/D converter 42, a CPU 43, a RAM 44 and a ROM 45, which are connected to each other by an address data bus 39. An analogue output from the throttle opening sensor 19 is delivered to the A/D converter 42, and pulses from the rotational angle sensors 20 and 21 are delivered to the input interface 41. The control voltages Vin and Vout to the flow control valve 30 and the pressure control valve 24 are delivered from the D/A converter 40 through amplifiers 50 and 51, respectively.

The basic principle of the control of one embodiment of this invention will now be described, with reference to FIGS. 3 and 4, before the control system of this embodiment is described.

Figure 3:
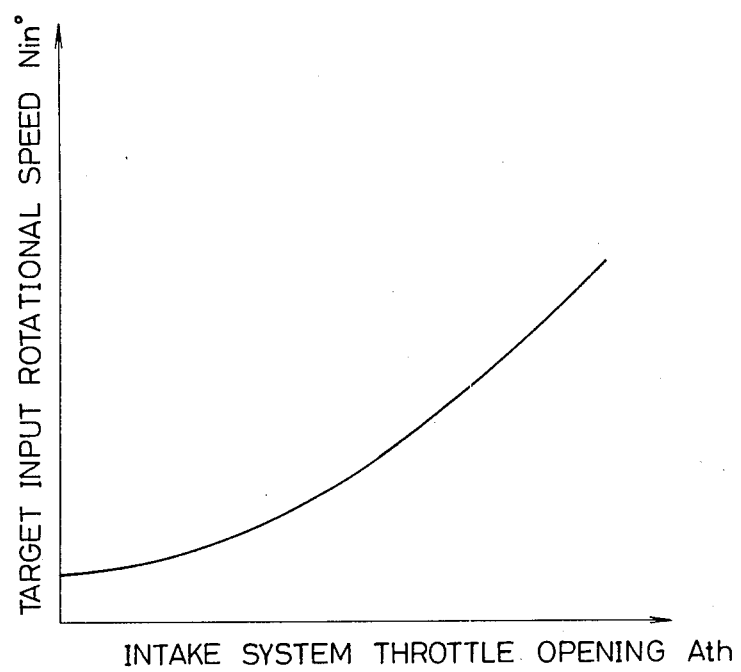
FIG. 3 is a chart showing the relationship between an intake throttle opening and a target input rotational speed.
Figure 4:
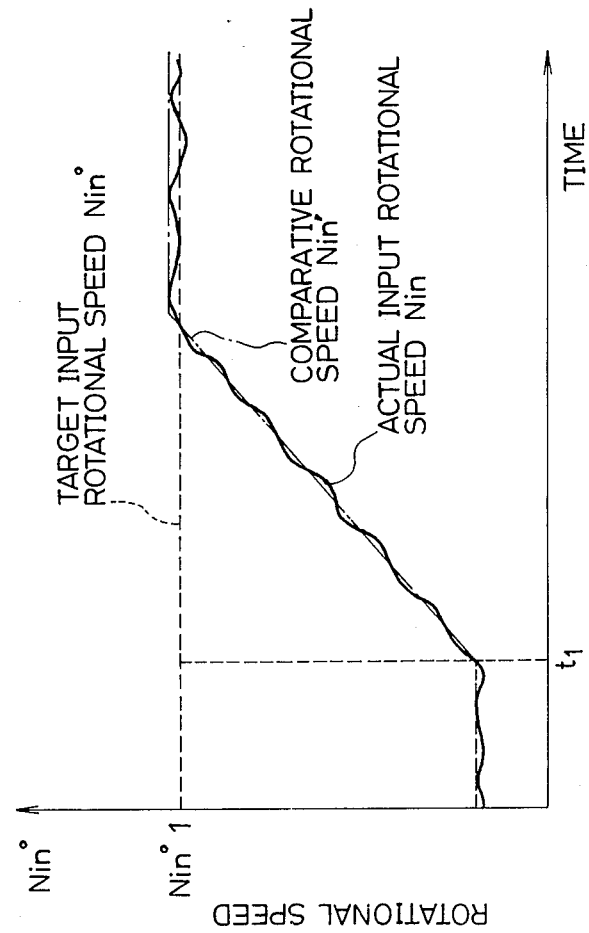
FIG. 4 is a chart showing the relationship between a target input rotational speed, an actual input rotational speed and a comparative rotational speed, along a time axis.

In FIG. 3, the throttle opening Ath of the intake system is given as an abscissa and the target input rotational speed Nin° (a target engine rotational speed Ne°) is given as an ordinate. As described in detail in Japanese Patent Application No. 67362/1982 and the like, the relationship between Ath-Nin° is set so that a demanded output can be obtained at a minimum fuel consumption rate. FIG. 4 shows a change per unit time of the input rotational speed Nin and the like of the CVT. When the target input rotational speed Nin° is approximately equal to Nin° 1 at a time t, if Nin is controlled utilizing Nin° 1 as the direct target value, then, when Nin approaches the target value Nin° 1, the change per unit time decreases. This is disadvantageous in that reaching the target value is delayed. To eliminate this disadvantage in one embodiment of this invention, comparative rotational speeds Nin' are set, besides the target input rotational speed Nin°, and Nin is feedback-controlled, utilizing Nin' as the target value. The comparative rotational speeds Nin' are set as the ideal locus of Nin, i.e., the ideal locus of the shift speeds, until Nin reaches the proper target value Nin°. The optimal values of Nin' are selected experimentally or selected from theoretical formulae and the like, and in consideration of the various control performances. Additionally, this control method is disclosed in detail in Japanese Patent Laid-Open (Kokai) No. 26656/1984.

Figure 5:
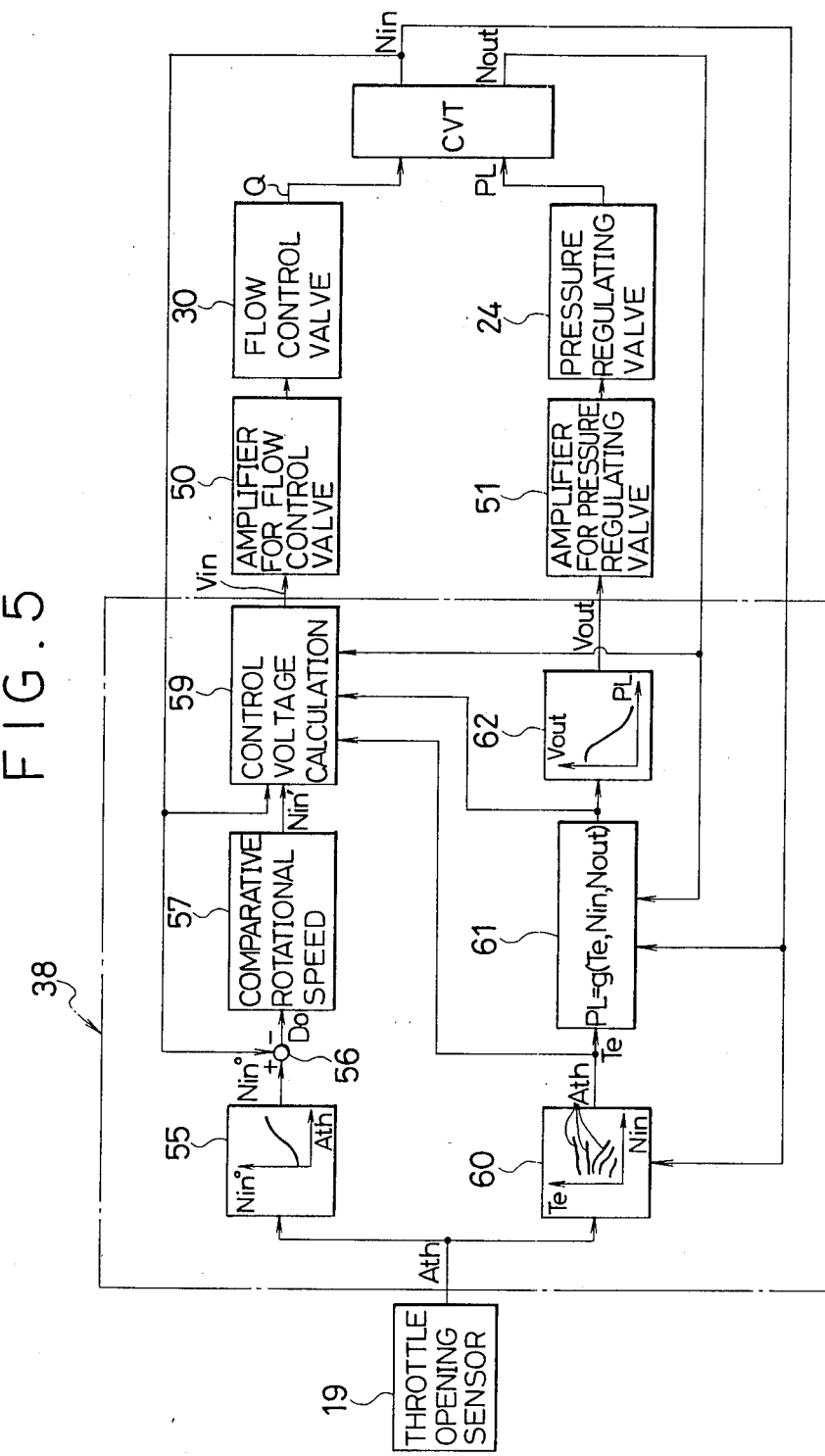
FIG. 5 is a block diagram of the speed ratio control used in the embodiment of FIG. 1.

FIG. 5 is the general block diagram showing the control system of the above-described system. The outline of the control system will first be described with reference to FIG. 5. In block 55, the target input rotational speed Nin° is calculated as a function of the throttle opening Ath on the basis of the value of the throttle opening Ath detected by the throttle opening sensor 19. At Point 56, a deviation Do between Nin° and the actual input rotational speed Nin of the CVT ($=$Nin°$-$Nin) is determined. In Block 57, the comparative rotational speed Nin' is calculated on the basis of deviation Do. In Block 59, the control voltage Vin to the flow control valve 30 is determined on the basis of comparative rotational speed Nin', and this control voltage Vin is delivered to the flow control valve 30 through the amplifier 50. As a result, the flowrate Q to the hydraulic servo device on the input side of the CVT through the flow control valve 30 is adjusted, and, the speed ratio e of the CVT, namely Nin, is varied. In other words, Nin is feedback-controlled by using the comparative rotational speed Nin' in the form of the target value.

In Block 60, the output shaft torque Te of the engine E/G is calculated as a function of the throttle opening Ath and the input rotational speed Nin. In Block 61, the line pressure PL is determined by calculating a function g or by referring to a map of the engine output torque Te and the input and output rotational speeds Nin and Nout of the CVT. In Block 62, the control voltage Vout of the pressure control valve for generating the line pressure PL is determined by calculating the function or referring to the map showing the line pressure PL and Vout. This control voltage Vout is delivered to the pressure control valve 24 through the amplifier 51 for the pressure control valve. As a result, the line pressure PL is held at substantially the minimum value necessary to transfer the torque by the driving belt, thus avoiding power loss and reduced durability of the driving belt due to excessive line pressure.

The details of the control voltage calculation in Block 59 will be given hereunder with reference to the block diagram shown in FIG. 6.

At Point 102, a deviation $D=$Nin'$-$Nin between the comparative rotational speed Nin' and the input rotational speed Nin of the CVT is calculated. In Block 104, this deviation D is multiplied by the feedback gain Kp to thereby calculate $D'=Kp\times D$. In Block 106, the flowrate Q in the flowrate control valve 30, corresponding to the deviation D', is calculated by the function f1 or by referring to a map of the speed ratio e, the input rotational speed Nin, and the rate of change in the output rotational speed dNout. As an example of the function f1, equation (1) may be adopted.

$$\begin{aligned}Q &= f1\ (e,\ Nin,\ dNout,\ D') \\ &= (C1/G) \times \{1 - C2(e-1)(5e-1)/G\} \\ &\quad \times \{(dNout - e \times D')/Nin\}\end{aligned}$$

$$G=(e+1)^2 \qquad (1)$$

where C1 and C2 are constant.

In Block 108, a corrected flowrate Q' is determined by using the flowrate Q the oil pressure upstream and downstream of the flow control valve and the leak value of the flow control valve. The control voltage Vin associated with this Q' is also determined. As an example of the function used in the calculation of Q' in 108, equation (2) may be used.

$$Q' = \{Q + Q\text{val} + C11 \times (P\text{in})^{C12}\} \times (P\text{val}^\circ \times P\text{val})^{\frac{1}{2}} \quad (2)$$

Figure 7:
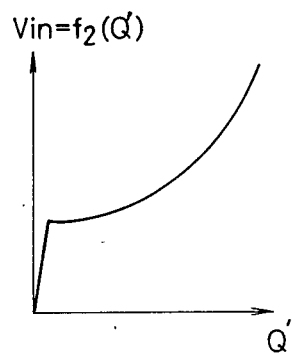
FIG. 7 is a chart showing the relationship between the corrected flowrate Q' and the control voltage.

In equation (2), when $Q > 0$, equations (3) and (4) may be adopted, and, when $Q \leq 0$, equations (5) and (6) may be adopted.

$$Q > 0: Q\text{val} = C13 \times (P\text{in})^{C14} \quad (3)$$

$$P\text{val} = |PL - P\text{in}| \quad (4)$$

$$Q \leq 0 Q\text{val} = -C15(PL - P\text{in})^{C16} \quad (5)$$

$$P\text{val} = P\text{in} \quad (6)$$

where C11 and C16 are constants, Pval is a difference in pressure upstream and downstream of the flow control valve 30 (a difference in Pressure between A and B, or A and C in FIG. 2), Pval° is a reference pressure of Pval which shows the characteristics in FIG. 7, Pin is the oil pressure at the input side of the flow control valve, and Qval is a leak value of the flow control valve.

When the corrected flowrate Q' is determined as described above, the control voltage Vin to the flow control valve 30 may be determined by equation (7) or by referring to a map of Vin and Q.

$$V\text{in} = f6(Q') \quad (7)$$

As an example of equation (7), FIG. 7 may be used. In FIG. 7, the flowrate-voltage (or current) characteristics of the flow control valve 30 are shown when the difference in pressure Pval between the upstream and the downstream of the flow control valve 30 is constant (= Pval°).

In Block 112, the speed ratio e is calculated from the input and output rotational speeds Nin and Nout on the basis of the following equation (8).

$$e = N\text{out}/N\text{in} \quad (8)$$

Figure 8:
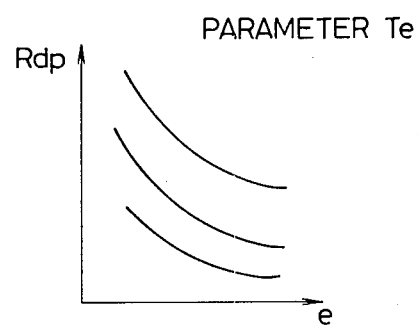
FIG. 8 is a chart showing the relationship between the speed ratio e and the thrust ratio, with output torque as a parameter.

In Block 114, a time differential value dNout of the output rotational speed Nout, i.e., rate of change in the Nout is calculated. Furthermore, in Block 116, a thrust ratio Rdp of the CVT is calculated by the function f7 or by referring to a map of the speed ratio e and the output shaft torque Te. The thrust ratio Rdp is the total thrust on the output side/the total thrust on the input side. FIG. 8 is an example of a map used to calculate a thrust ratio. In FIG. 8, the characteristics of the speed ratio e are shown in relation to the thrust ratio Rdp, with the output torque Te as a parameter.

In Block 118, oil pressure on the input side Pin is calculated by the function f3 or by referring to a map of the line pressure PL, the thrust Rdp of the CVT, the input and output rotational speeds Nin and Nout and the required flowrate Q. As an example of the function f3, equation (9) may be used.

$$\begin{aligned} P\text{in} &= f3\,(PL,\,Rdp,\,N\text{in},\,N\text{out},\,Q) \\ &= C21\,(RL + C22 \cdot N\text{out}^2)/Rdp - C23 \cdot N\text{in}^2 \\ &\quad + f4\,(Q) \end{aligned}$$

where C21 and C23 are constants.

Figure 9:
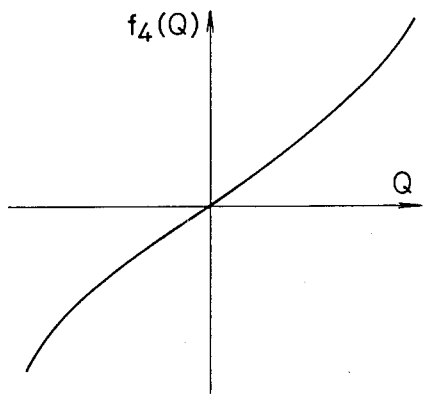
FIG. 9 is a chart showing the relationship between the term of correction and the flowrate Q when the oil pressure on the input side is determined.

An example of the characteristics of f4 (Q) is shown in FIG. 9.

Figure 10:
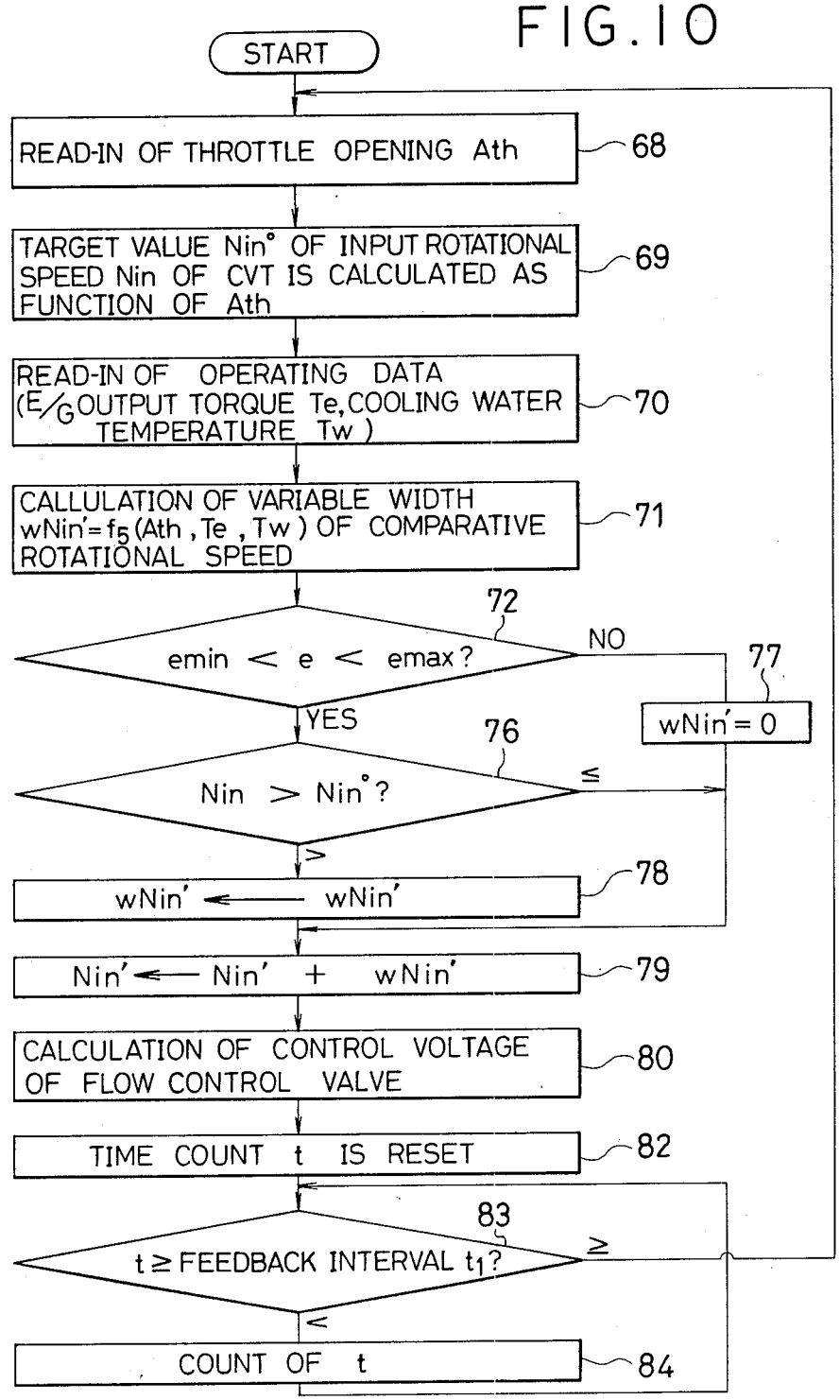
FIG. 10 is a flow chart showing the speed ratio control routine as a whole.

FIG. 10 shows the flow chart based on the block diagram shown in FIG. 5.

First, in Step 68, the throttle opening Ath is read in. In Step 69, the target value Nin° of the input rotational speed Nin of the CVT is calculated as a function of the throttle opening Ath. In Step 70, as operating data, the engine output shaft torque Te and cooling water temperature Tw are read in (The output shaft torque Te is calculated in Block 60 of FIG. 5). In Step 71, a variable range wNin' of the comparative rotational speed Nin' is calculated by the function f5 of Ath, Te and Tw. In Step 72, a judgment is made as to whether the speed ratio e of the CVT is within the range of the minimum value emin < e < the maximum value emax. When the speed ratio e is with in this range, the routine proceeds to Step 76, and, when the speed ratio e is not within this range, the routine proceeds to Step 77. In Step 76, a judgment is made as to whether the input rotational speed Nin is larger than Nin°. When Nin > Nin°, the routine proceeds to Step 78, and, when Nin ≦ Nin°, Step 78 is bypassed.

In Step 77, wNin' is set equal to zero. In Step 78, Nin' is set equal to −wNin'. In Step 79, Nin' is set equal to Nin' + wNin'. As a result of these Steps, when Nin is larger than the target value Nin°, the comparative rotational speed Nin' is increased by a change wNin' calculated in Step 71, and, when Nin is less than the target value Nin°, the comparative rotational speed Nin' is decreased by a change wNin' calculated in Step 71. Further, when e ≦ emin or e ≧ emax, Nin is set equal to zero in Step 77, and Nin' is not changed in Step 79. This is because in such a case, even if Nin' is changed, the CVT cannot follow the change.

In Step 80, the control voltage Vin of the flow control valve is calculated. This calculation is performed according to the block diagram shown in FIG. 6 and will be described hereunder in detail.

Figure 11:
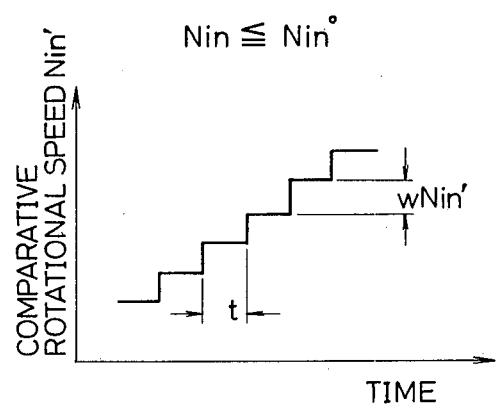
FIGS. 11A and 11B is a chart showing a change per unit time of the comparative rotational speed.
Figure 11:
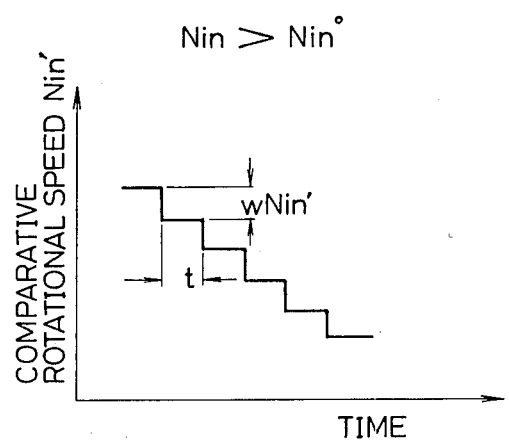

In Step 82, a time count t is reset. The time count t counts the time lapse on the basis of inputs of clock pulses. In Step 83, a judgment is made as to whether t ≦ a feedback interval t1 or not. When t ≧ t1, the routine returns to Step 86, and when t < t1, the routine proceeds to step 84. In Step 84, t is counted, and the routine returns to Step 83. When the comparative rotational speed Nin' is redefined in Step 79 as described above, the input rotational speed Nin is feedback-controlled by a predetermined feedback interval t1 to be Nin', and, after a lapse of a time duration t1, a new comparative rotational speed Nin' is set again in Step 79. Consequently, when Nin ≦ Nin°, the comparative rotational speed Nin' is as shown in FIG. 11(A), and when Nin > Nin°, the comparative rotational speed Nin' is as shown in FIG. 11(B). Thus, Nin is quickly transferred to Nin°.

Figure 1:
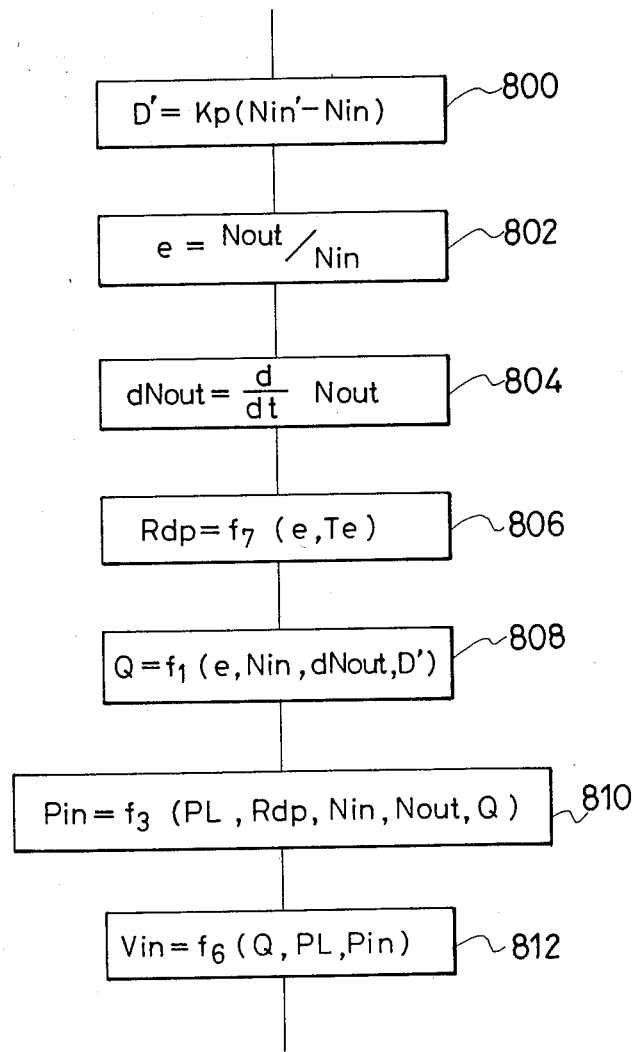
FIG. 1 is a flow chart partially showing the routine of the speed ratio control in one embodiment of the present invention.

Description will now be given of the aforesaid calculation flow in Step 80 with reference to the flow chart shown in FIG. 1.

Figure 6:
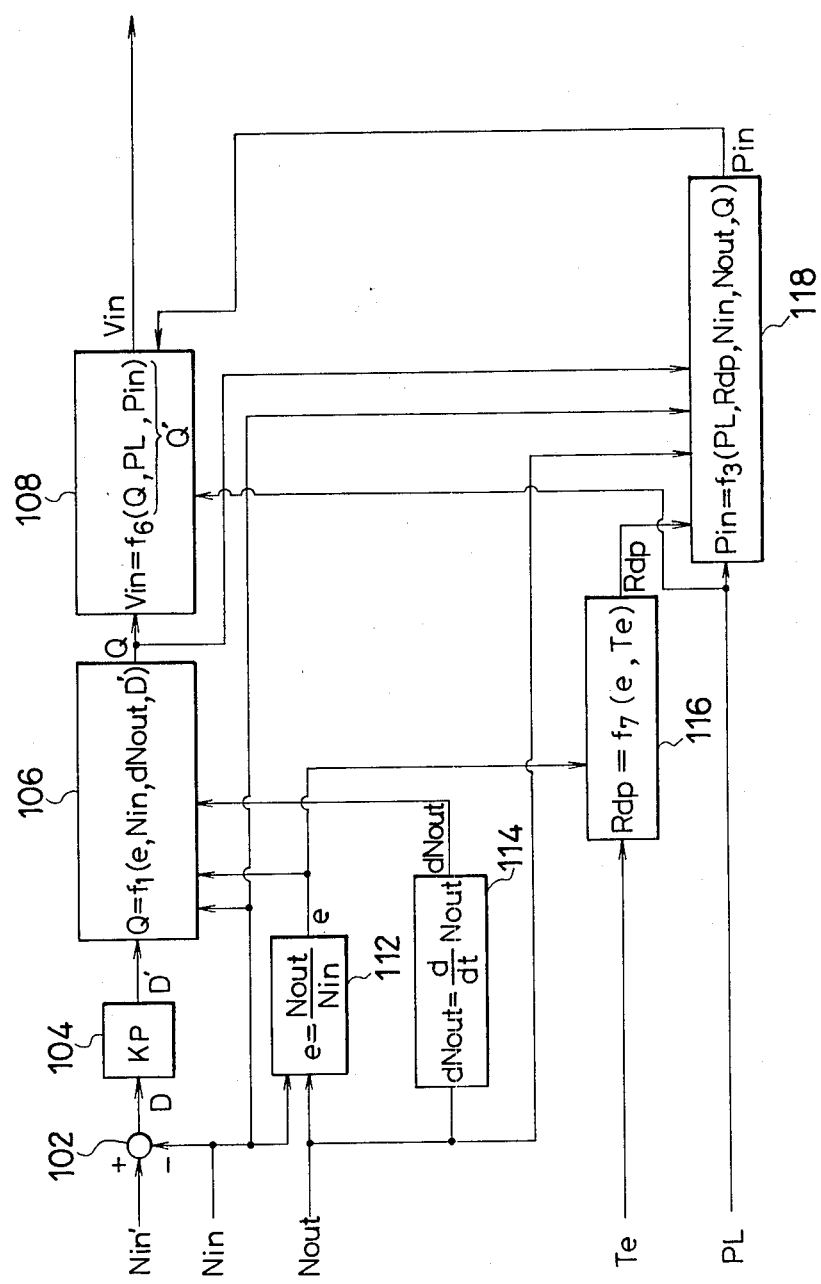
FIG. 6 is a block diagram showing the calculation of the control voltage of the flow control valve.

Since the detailed description of the contents of the respective calculations is provided in FIG. 6, here, the description will primarily be concerned with the order of the calculations.

First, in Step 800, a difference between the comparative rotational speed Nin' and the actual input rotational speed Nin is multiplied by the constant Kp to determine a deviation D'. In Step 802, a ratio between the output rotational speed Nout and the input rotational speed Nin is determined to provide the current speet ratio e. In Step 804, the output rotational speed Nout is differentiated to determine a rate of change dNout of the output rotational speed Nout. Subsequently, in Step 806, the thrust ratio Rdp is determined from the speed ratio e and the engine output shaft torque Te by calculating the function f7 or by referring to a map of these values. In Step 808, the flowrate Q to the hydraulic servo device on the input side is determined by the calculation, in the function f1, of e, Nin, Nout and e', which were obtained in Steps 800, 802 and 804, respectively, or referring to the map of these values.

In Steps 810 and 812, the flowrate Q thus determined is corrected to Q' by a leak value Qval of the flow control valve and the difference Pval in oil pressure in the line upstream and the line downstream of the flow control valve, and thereafter, a control voltage for the flow control valve, corresponding to the flowrate Q' thus corrected, is determined. More specifically, in Step 810, first, the oil pressure Pin on the input side of the flow control valve is determined by the calculation of the function f3 of the line pressure PL, the thrust ratio Rdp, the input and output rotational speeds Nin and Nout and the flowrate Q or by referring to a map of these values. Then, in Step 812, the control voltage Vin to the flow control valve 30 is determined by the calculation of the function f6 of the flowrate Q, the line pressure PL and the oil pressure Pin on the input side or by referring to a map of these values. As described in detail above, the leak value Qval and the difference in oil pressure Pval, upstream and downstream of the flowrate control valve 30 can be indicated as a function of the line pressure PL and the oil pressure Pin on the input side, respectively, either when $Q > 0$ or $Q \leq 0$.

Additionally, in this embodiment, the line pressure PL and the input oil pressure Pin are calculated to reduce cost. However, the present invention need not necessarily be limited to this. Oil pressure sensors may be provided upstream and downstream of the flow control valve and outputs therefrom may be directly used. Oil pressure sensors are more accurate than calculated values.

Description will hereunder be given of another embodiment of the present invention.

Figure 12:
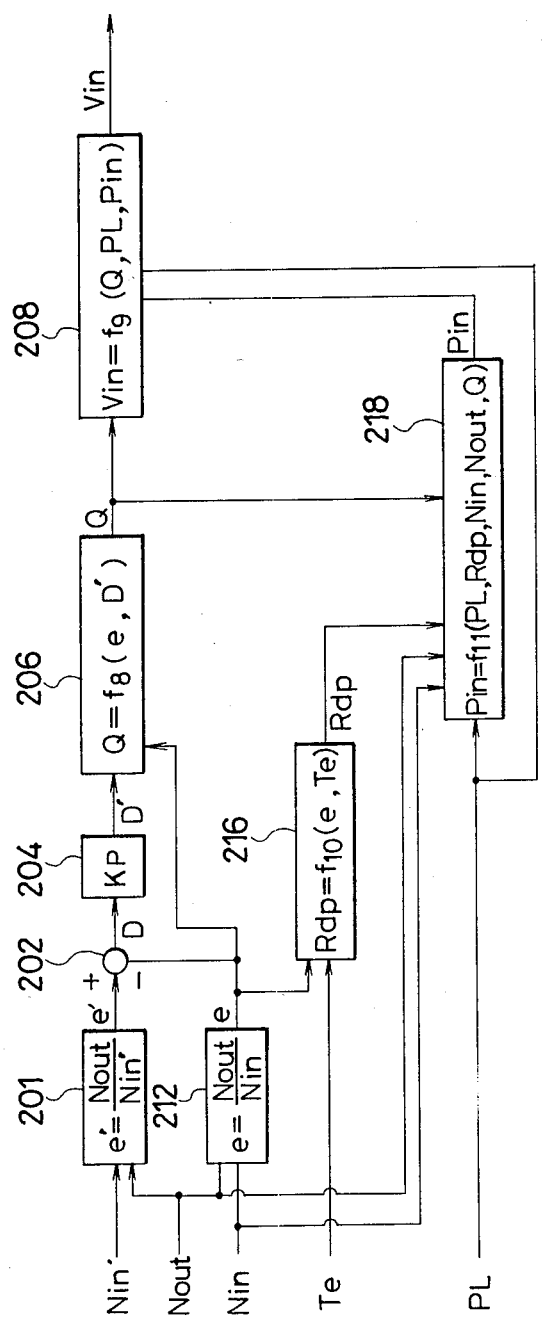
FIG. 12 is a block diagram setting forth a calculation according to another embodiment of the present invention, corresponding to FIG. 6.

In the above-described embodiment, the correction is made so that the control voltage and the difference between the target rotational speed and actual rotational speed can have a linear relationship over the entire area of control. However, speed ratio may be used in place of the input rotational speed. FIG. 12 shows the block diagram when the speed ratio is used.

In Block 201, the comparative speed ratio e' corresponding to the comparative rotational speed Nin' is calculated by the following equation (10).

$$e' = Nout/Nin' \quad (10)$$

In Block 202, the deviation D is calculated by e'−e. In Block 204, this deviation D is multiplied by the feedback gain Kp to calculate D'. In Block 206, the flowrate Q of the flow control valve 30, corresponding to the deviation D', is determined by the calculation of the function f8 of the speed ratio e and the deviation D' or by referring to a map relating Q, e, and D'. As an example of the calculation, the following equation (11) may be used.

$$Q = f8(e, D')$$
$$= (C31/G) \times \{1 - C32(e-1)(5e-1)/G\} \times D'$$
$$G = (e+1)^2 \quad (11)$$

Since Blocks 208, 212, 216 and 218 are similar to Blocks 108, 112, 116 and 118 of the preceding embodiment, description thereof will not be repeated.

Figure 13:
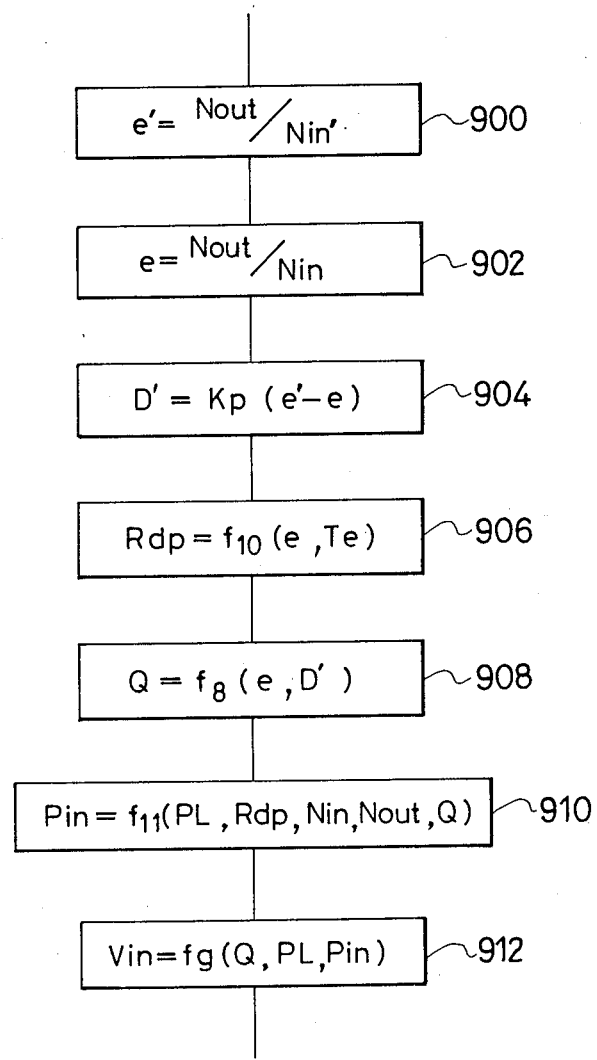
FIG. 13 is a flow chart corresponding to FIG. 1.

FIG. 13 shows the flow chart based on FIG. 12. Steps 900 to 908 are Steps for determining the flowrate Q on the bases of speed ratio e as described above. Since Steps 910 and 912 according to the present invention are similar to Steps 810 and 812 as described above, a detailed description of FIG. 13 will not be repeated.

Additionally, in the above-described embodiment, the correction of the flow control valve is performed during calculation stage of the flowrate Q. However, the change per unit time of the speed ratio e or the input rotational speed Nin is associated with the flowrate Q in the flow control valve which is associated with the control voltage Vin for controlling the flow control valve. Consequently, the correction based on the characteristics of the flow control valve can be performed at any stage. The correction is such that the linearity is held over the entire area of control.

While the preferred embodiment of the present invention has been described, it is to be understood that the invention is not limited thereto, and may be otherwise embodied within the scope of the following claims.

What is claimed is:

1. A speed ratio control system for a continuously variable transmission, wherein said control system controls an oil flow rate to a hydraulic servo of a V-shaped pulley device on an input or an output side so that a speed ratio between the input and the output sides can be continuously changed, said oil flow rate being controlled by a flow control valve continuously variable with a control voltage or current, said system comprising:
   means for seeking a deviation between a target value and a measured value, said values corresponding to speed ratios of said continuously variable transmission; and
   means for making a correction so that said deviation and a rate of change per unit time of said speed ratio will have a linear relationship over the entire area of control, said correction being made at least in accordance with operational characteristics of said flow control valve.

2. The speed ratio control system as set forth in claim 1, wherein said operational characteristics of said flow control valve include a difference in oil pressure upstream and downstream of said flow control valve.

3. The speed ratio control system as set forth in claim 1, wherein said operational characteristics of said flow control valve include a leak characteristic of said flow control valve.

4. A speed ratio control system for a continuously variable transmission, wherein said control system controls an oil flow rate to a hydraulic servo of a V-shaped pulley device on an input or an output side so that a rotational speed of said input or output side can be continuously changed, said oil flow rate being controlled by a flow control valve continously variable with a control voltage or current, said system comprising:

means for seeking a deviation between a target value and a measured value, said values corresponding to rotational speeds of either said input or output side; and means for making a correction so that said deviation and a rate of change per unit time of said rotational speed will have a linear relationship over the entire area of control, said correction being made in accordance with operational characteristics of said flow control valve.

5. The speed ratio control system as set forth in claim 4, wherein said operational characteristics of said flow control valve include a difference in oil pressure upstream and downstream of said flow control valve.

6. The speed ratio control system as set forth in claim 4, wherein said operational characteristics of said flow control valve include a leak characteristic of said flow control valve.

7. The speed ratio control system as set forth in claim 1, wherein said means for making a correction comprises means for setting a locus of comparative speed ratios whereby the measured value is feedback controlled utilizing the comparative speed ratios as intermediate target values.

8. The speed ratio control system as set forth in claim 4, wherein said means for making a correction comprises means for setting a locus of comparative rotational speeds whereby the measured value is feedback controlled utilizing the comparative rotational speeds as intermediate target values.

* * * * *